United States Patent [19]

Muller

[11] Patent Number: 4,554,527

[45] Date of Patent: Nov. 19, 1985

[54] TIRE HEIGHT SENSOR WITH VALVE STEM ATTACHING TRANSMITTER MODULE

[75] Inventor: George H. Muller, Ann Arbor, Mich.

[73] Assignee: Ford Motor Company, Dearborn, Mich.

[21] Appl. No.: 134,599

[22] Filed: Mar. 27, 1980

[51] Int. Cl.⁴ .............................................. B60C 23/00
[52] U.S. Cl. ..................................... 340/58; 200/61.23
[58] Field of Search ............ 340/58; 200/61.22, 61.23, 200/61.25

[56] References Cited

U.S. PATENT DOCUMENTS

| | | | |
|---|---|---|---|
| 820,041 | 5/1906 | Ferdinand | 200/61.22 |
| 3,111,644 | 11/1963 | Froelich et al. | 340/58 |
| 3,533,063 | 10/1970 | Garcia | 340/58 |
| 3,787,806 | 1/1974 | Church | 340/58 |
| 4,117,452 | 9/1978 | Snyder et al. | 200/61.23 |
| 4,137,520 | 1/1979 | Deveau | 340/58 |
| 4,160,234 | 7/1979 | Karbo et al. | 340/58 |
| 4,196,414 | 4/1980 | Muller | 340/58 |

FOREIGN PATENT DOCUMENTS 2528352  1/1976  Fed. Rep. of Germany .

Primary Examiner—James J. Groody
Attorney, Agent, or Firm—Paul K. Godwin, Jr.; Robert D. Sanborn

[57] ABSTRACT

A pneumatic tire profile height sensor system which includes a compressible sensor combined with an electrical signal generator mounted within a vehicle wheel and electrically connected through an inflation valve stem to a signal transmitter mounted on said valve stem external to the wheel.

10 Claims, 1 Drawing Figure

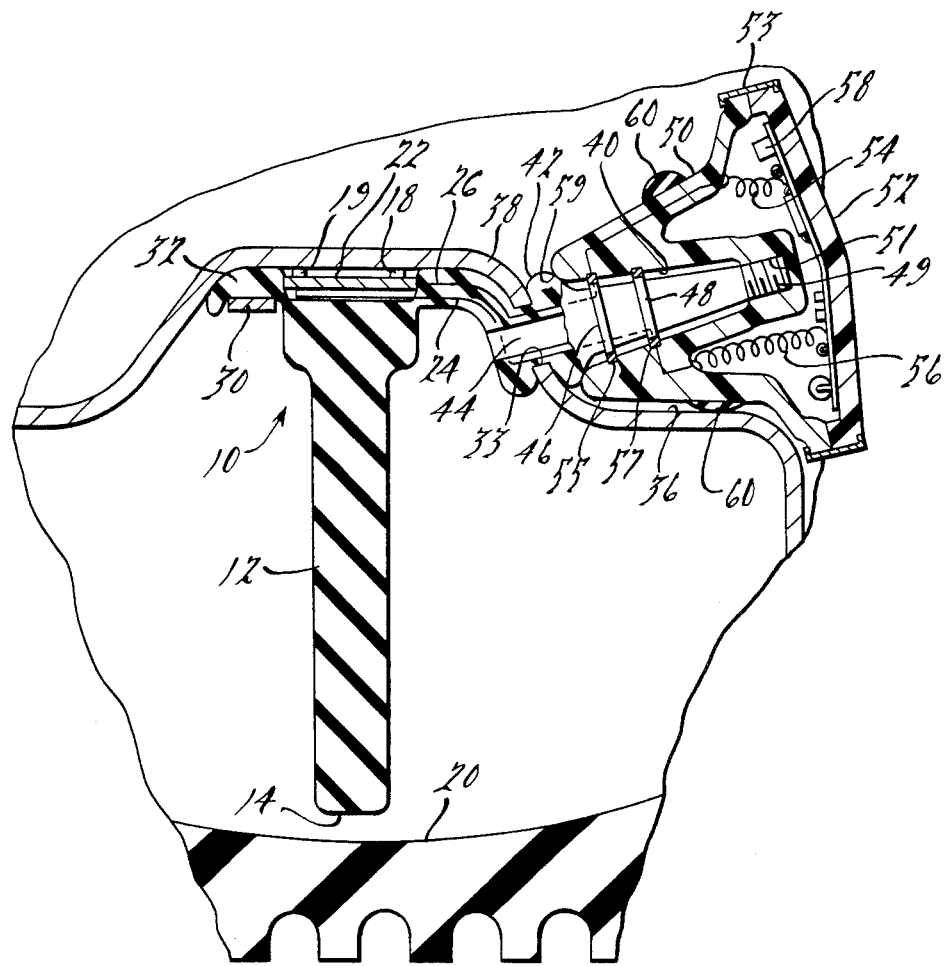

TIRE HEIGHT SENSOR WITH VALVE STEM ATTACHING TRANSMITTER MODULE

CROSS REFERENCE TO RELATED APPLICATIONS

The subject application is related to copending U.S. patent application Ser. No. 968,944, filed Dec. 13, 1978 now U.S. Pat. No. 4,196,414 for an Integral Tire Inflation Valve and Tire Height Sensor.

BACKGROUND OF THE INVENTION

1. Field of the Invention

The present invention relates to vehicle safety devices and more specifically, to pneumatic tire height sensors, as utilized in low tire warning systems.

2. Description of the Prior Art

As outlined in the above-noted copending application there are generally two approaches to monitoring pneumatic vehicle tires and providing operator warning when a monitored tire is approaching a failure mode.

A historically conventional technique, for which a large body of prior art has evolved, is the monitoring of pressure within a pneumatic tire and comparing that internal pressure with a standard pressure or atmospheric pressure to determine when the tire pressure is below a predetermined value.

A more recently developed technique involves the monitoring of the road contact profile height of the pneumatic tire in order to sense low inflation pressure or overload of the tire. It is believed that the profile height monitoring technique is a more reliable reflection of tire condition, since the predicted wear life of a tire is based upon inflation pressure and load factors. A system that detects under-inflation and/or overload and produces a warning signal allows the vehicle operator to make appropriate adjustments in order to avoid excessive wear.

A self-contained tire height sensor is shown in U.S. Pat. No. 4,117,452, wherein a sensing probe is mounted onto the wheel of a pneumatic tire and is radially oriented so as to be actuated by the inner casing of the tire when the tire is under-inflated or overloaded and the sensor is between the wheel and ground. Upon compression of the probe, a piezoelectric generator is actuated and a signal is transmitted from an associated transmitter circuit to a receiver remotely located within the vehicle. The probe/piezoelectric generator/transmitter is formed as a unitary structure and is mounted within the inflation chamber defined by the wheel and tire. Any failure of the electronics in this prior art system, requires the removal of the tire from the wheel in order to change the module.

The present invention is intended to overcome the serviceability disadvantages of the profile height sensors described in the prior art.

SUMMARY OF THE INVENTION

The present invention overcomes the problems of the prior art by providing an integral profile height sensor probe/piezoelectric generator/valve stem module for mounting inside an inflation chamber of a pneumatic wheel/tire combination and by providing a separate transmitter module, within a valve cap assembly, which attaches onto the threads of the valve stem extending outside of the wheel. Electrical communication between the internally mounted piezoelectric generator and the externally mounted transmitter is achieved via conductor elements molded within the integral structure interconnecting the generator to electrical contacts mounted on the outer surface of the valve stem extending from the wheel. The transmitter valve cap module has corresponding electrical contacts which mate with those on the valve stem when the cap is fully threaded onto the valve stem threads.

The present invention further includes a set of peripheral nodules on the outer surface of the transmitter valve cap module which contact the external surface of the wheel and tend to prevent vibrational dethreading of the module, when the nodules are centrifugally forced against the external surface of the wheel.

It is therefore an object of the present invention to provide a pneumatic tire profile height sensor that has improved serviceability features.

It is another object of the present invention to provide a two-piece pneumatic tire profile height sensor whereby the sensor and electrical generator are mounted inside the wheel and the transmitter portion is mounted on the outside of the wheel.

BRIEF DESCRIPTION OF THE DRAWING

The single FIGURE is a partial cross-sectional view of the described embodiment of the present invention.

DESCRIPTION OF THE PREFERRED EMBODIMENT

The probe assembly 10, of the present invention, is constructed to be mounted in the lowest portion of the well in a wheel 38. The probe assembly 10 is a unitary molded structure of a flexible material which includes a base 32, a sensor probe 12 and an inflation valve stem 40.

A piezoelectric generator 22 is embedded within the base 32 on support pads 18 and 19 and functions to provide electrical energy in response to compressive forces applied thereto. The sensor probe 12 extends radially from the base 32 towards a pneumatic tire 20 mounted on the wheel 38. A tip 14 of the sensor probe 12 provides the contact point to the inner lining of the tire 20 when the tire profile height is less than that recommended by the manufacturer. The length of the sensor probe 12 is selected according to the tire/wheel combination used. In low production volumes, it may be desired to employ a universal probe 12 where markings are located along its length to indicate the proper trim point for various tire/wheel combinations.

Since the base 32 is molded of a flexible material, it is compressible and may be tightly mated with a lower well portion of the rim 38. In the present embodiment, the probe assembly 10 is held by a band 30, circumferentially tightened and attached around the well portion of the wheel 38.

An inflation valve stem 40, shown in partial cross section, extends from the base 32 and is fed through an inflation aperture 33 in the well 38. The base 42 of the inflation valve 40 forms a grommet seal with the inflation aperture 33 to prevent air leakage. The valve 30 also functions with the aperture 33 to help hold the probe assembly in a fixed position on the wheel 38.

The inflation valve stem 40 further includes a conventional threaded portion 49 at its remote end, surrounding a conventional inflation valve mechanism (not shown) within an inflation passage 44.

A pair of conductive bands 46 and 48 are molded into the outer surface of the tapered body of the inflation valve 40 and are electrically connected to the piezoelectric generator 22 with conductor wires 24 and 26, respectively. The conductor wires 24 and 26 are molded into the probe assembly so as to provide protection of the conductors during installation and useage.

A removable valve cap 50 houses the electronic transmitter portion 58 of the tire height sensor and mounts on the inflation valve 40. An internal threaded socket 51 mates with the external threads 49 of the valve stem 40 to secure the cap 50. Two contact rings 55 and 57 are located within the socket 51 and spaced so as to respectively mate with conductive bands 46 and 48 when the cap 50 is fully threaded onto the valve 40.

The electronic transmitter 58 is preferably potted into the cap 50 and electrically connected to the contact rings 55 and 57 with conductor wires 54 and 56, respectively.

In operation, when the tire profile is below its rated height value due to under-inflation or overload, the tip 14 of the probe 12 touches the inner liner of the tire 20 once for each revolution. At each occurrence, the probe 12 communicates compressive force to the piezoelectric generator 22. The piezoelectric generator 22 responsively produces an electrical signal each time it is compressed by the probe 12. The conductors 24 and 26 carry the electrical signal through the wheel aperture to the conductive bands 46 and 48 respectively. If the transmitter module is fully threaded onto the inflation valve stem 40, the electrical signal is communicated by conducting rings 46 and 48 to the electronic transmitter 58. After a sufficient number of occurring signals are accumulated from the piezoelectric generator 22, the transmitter 58 generates an RF signal. The RF signal is detected by a receiver (not shown) remotely located in the associated vehicle. The receiver appropriately indicates a low tire condition to the vehicle operator.

In the preferred embodiment, the valve cap transmitter module 50 contains a ring of raised nodules 60 on the outside thereof so that one or more of the nodules 60 may contact the external surface 36 of the wheel 38. The nodules 60 provide for frictional contact with the surface 36 that prevents the transmitter 50 from being vibrationally dethreaded from the valve stem. When the wheel 38 is rotating, centrifugal force tends to compress the contacting nodules 60 against the surface 36 and providing the resistance to any dethreading tendency of the transmitter module 50.

A flexible annular seal 59 is located at the open end of the transmitter module 50 so that when the module is fully threaded onto the valve stem 40, the flexible seal 59 is tightly compressed against the base 42. This provides a water tight seal to prevent corrosion of the electrical contacts.

It will be apparent that many modifications and variations may be effected without departing from the scope of the novel concept of this invention. Therefore, it is intended by the appended claims to cover all such modifications and variations which fall within the true spirit and scope of the invention.

What is claimed is:

1. A pneumatic tire profile height sensor system including:

a wheel rim for mounting a pneumatic tire;

a compressible probe extending radially from the inside of said wheel rim;

a power source between said probe and said wheel rim for generating electrical energy in response to said probe touching the inside casing of a pneumatic tire mounted on said wheel rim;

a radio frequency transmitter mounted external of said wheel rim and being electrically connected to said internal power source;

an inflation valve adjacent said probe and extending through said wheel rim, wherein said transmitter attaches to the externally extended portion of said wheel valve;

wherein said externally extending portion of said inflation valve has a base portion against said wheel rim, an extreme end opening and a plurality of exposed electrical contacts, between said base and said opening, being electrically connected to said power source; and said radio frequency transmitter is encased within an inflation valve cap and contains a plurality of electrical contacts disposed to contact corresponding ones of exposed contacts on said inflation valve when said cap is attached to said valve.

2. A sensor system as in claim 1, wherein said valve is provided with threads at its extreme end opening and said inflation valve cap contains threads for mating with said valve thread to attach said radio frequency transmitter to said valve.

3. A sensor system as in claim 2, wherein said valve cap contains a plurality of raised portions around its outside perimeter of sufficient height to contact said wheel rim when said cover is threaded fully onto said valve threads.

4. A sensor system as in claim 2, wherein said valve cap contains an elastomer end opening which compressibly seals against the base of said externally extending valve when said cover is threaded fully onto said valve threads.

5. A sensor system as in claim 4, wherein said valve cap contains a plurality of raised portions around its outside perimeter of sufficient height to contact said wheel rim when said cover is threaded fully onto said valve threads.

6. A pneumatic tire profile height sensor system including:

a wheel rim for mounting a pneumatic tire;

a compressible probe extending radially from the inside of said wheel rim;

a power source between said probe and said wheel rim for generating electrical energy in response to said probe touching the inside casing of a pneumatic tire mounted on said wheel rim which comprises a piezoelectric generator that generates electrical energy in response to said probe communicating compressing forces at said generator;

a radio frequency transmitter mounted external of said wheel rim and being electrically connected to said internal power source;

an inflation valve adjacent said probe and extending through said wheel rim, wherein said transmitter attaches to the externally extended portion of said wheel valve;

wherein said externally extending portion of said inflation valve has a base portion against said wheel rim, an extreme end opening and a plurality of exposed electrical contacts, between said base and said opening, being electrically connected to said power source; and said radio frequency transmitter is encased within an inflation valve cap and contains a plurality of electrical contacts disposed to contact corresponding ones of exposed contacts on said inflation valve when said cap is attached to said valve.

7. A sensor system as in claim 6, wherein said valve is provided with threads at its extreme end opening and said inflation valve cap contains threads for mating with said valve thread to attach said radio frequency transmitter to said valve.

8. A sensor system as in claim 7, wherein said valve cap contains a plurality of raised portions around its outside perimeter of sufficient height to contact said wheel rim when said cover is threaded fully onto said valve threads.

9. A sensor system as in claim 7, wherein said valve cap contains an elastomer end opening which compressibly seals against the base of said externally extending valve when said cover is threaded fully onto said valve threads.

10. A sensor system as in claim 9, wherein said valve cap contains a plurality of raised portions around its outside perimeter of sufficient height to contact said wheel rim when said cover is threaded fully onto said valve threads.

* * * * *